United States Patent
Becker et al.

(10) Patent No.: US 8,296,056 B2
(45) Date of Patent: Oct. 23, 2012

(54) ENHANCED VISION SYSTEM FOR PRECISION NAVIGATION IN LOW VISIBILITY OR GLOBAL POSITIONING SYSTEM (GPS) DENIED CONDITIONS

(75) Inventors: Robert C. Becker, Eden Prairie, MN (US); David W. Meyers, Brooklyn Park, MN (US); Alan G. Cornett, Andover, MN (US); Thomas W. Heidemann, Anoka, MN (US); Long Bui, Palos Verde Estates, CA (US)

(73) Assignee: Honeywell International Inc., Morristown, NJ (US)

( * ) Notice: Subject to any disclaimer, the term of this patent is extended or adjusted under 35 U.S.C. 154(b) by 556 days.

(21) Appl. No.: 12/426,892

(22) Filed: Apr. 20, 2009

(65) Prior Publication Data

US 2010/0268458 A1  Oct. 21, 2010

(51) Int. Cl.
*G01C 21/30* (2006.01)
(52) U.S. Cl. .................................................. 701/408
(58) Field of Classification Search ....... 701/3; 340/961
See application file for complete search history.

(56) References Cited

U.S. PATENT DOCUMENTS

| | | | |
|---|---|---|---|
| 5,828,332 A | 10/1998 | Frederick | |
| 5,892,462 A | 4/1999 | Tran | |
| 6,216,065 B1 | 4/2001 | Hall et al. | |
| 6,219,592 B1 | 4/2001 | Muller et al. | |
| 6,362,776 B1 | 3/2002 | Hager et al. | |
| 6,512,976 B1 | 1/2003 | Sabatino et al. | |
| 6,606,034 B1 | 8/2003 | Muller et al. | |
| 6,750,807 B1 | 6/2004 | Hager et al. | |
| 6,885,334 B1 | 4/2005 | Hager et al. | |
| 6,897,803 B2 | 5/2005 | Hager et al. | |
| 7,409,292 B2 | 8/2008 | Eckert et al. | |
| 7,486,221 B2 | 2/2009 | Meyers et al. | |
| 2003/0014165 A1* | 1/2003 | Baker et al. | 701/3 |
| 2004/0239529 A1* | 12/2004 | Tran | 340/961 |
| 2005/0273257 A1 | 12/2005 | Hager et al. | |
| 2006/0253254 A1 | 11/2006 | Herwitz | |
| 2008/0316089 A1 | 12/2008 | Forgrieve et al. | |

OTHER PUBLICATIONS

Meyers et al., "Radar System for Obstacle Avoidance", "U.S. Appl. No. 12/245,334, filed Oct. 3, 2008".
Meyers et al., "System and Method for Obstacle Detection and Warning", "U.S. Appl. No. 12/245,583, filed Oct. 3, 2008".
Becker et al., "Radar Altimeter With Forward Looking Radar and Data Transfer Capabilities", "U.S. Appl. No. 12/099,297, filed Apr. 8, 2008".
EP Search Report, EP 10159282.2-1248/2244239 dated Apr. 10, 2011.
EP Communication; Application No. 10159282.2-1248 dated Feb. 11, 2011.

* cited by examiner

*Primary Examiner* — Valerie Lubin
(74) *Attorney, Agent, or Firm* — Ingrassia Fisher & Lorenz, P.C.

(57) ABSTRACT

A method of generating an image of a volume ahead of an aerial vehicle is provided. The method comprises determining a position of the aerial vehicle and generating a terrain image corresponding to ground features correlated to the position of the aerial vehicle. Obstacle data pertaining to a set of obstacles ahead of the aerial vehicle is determined with a forward looking sensor. An obstacle overlay image is generated and overlain onto the terrain image to generate a composite image.

26 Claims, 7 Drawing Sheets

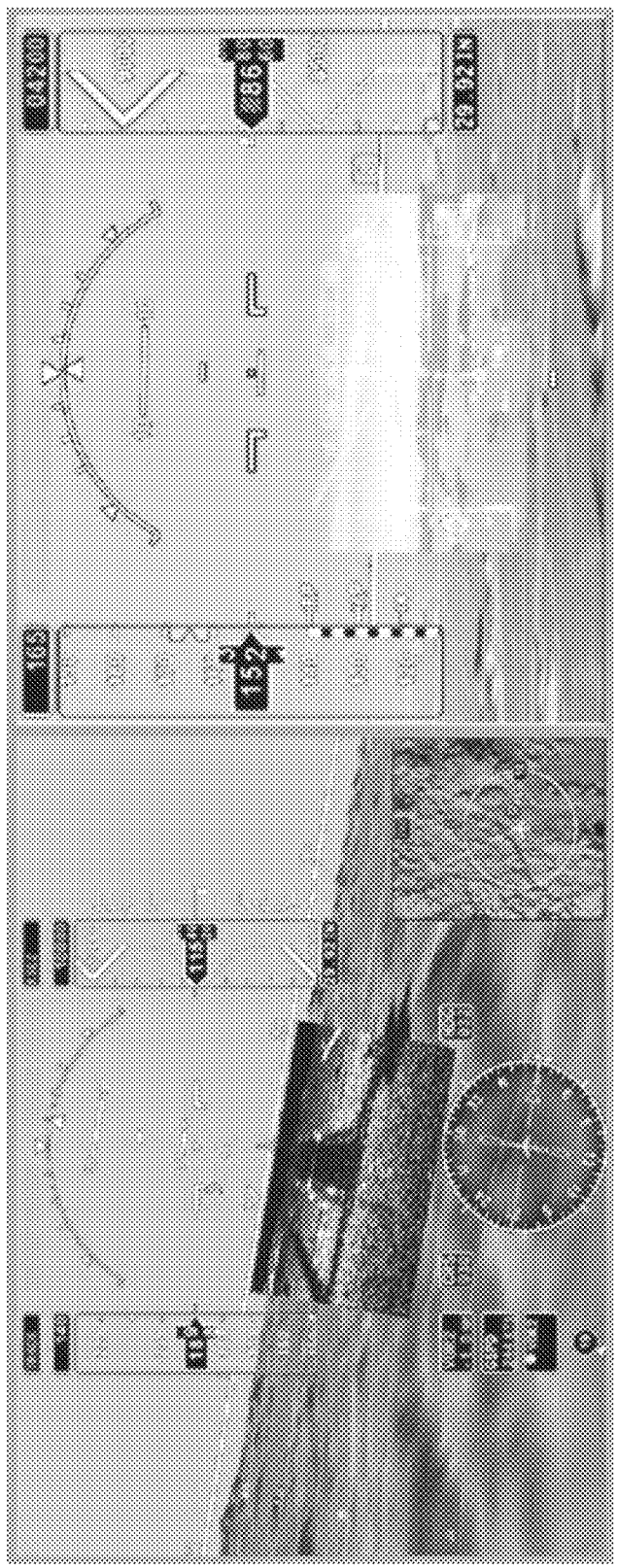

ENHANCED VISION SYSTEM FOR PRECISION NAVIGATION IN LOW VISIBILITY OR GLOBAL POSITIONING SYSTEM (GPS) DENIED CONDITIONS

CROSS REFERENCE TO RELATED APPLICATIONS

This application is related to the following United States patents and patent applications, all of which are hereby incorporated herein by reference:
U.S. Pat. No. 6,362,776, filed on Feb. 4, 2000, entitled "PRECISION RADAR ALTIMETER WITH TERRAIN FEATURE COORDINATE LOCATION CAPABILITY" (the '776 patent);
U.S. Pat. No. 6,897,803, filed on Jun. 11, 2003, entitled "RADAR ALTIMETER WITH FORWARD RANGING CAPABILITIES" (the '803 patent);
U.S. patent application Ser. No. 11/552,372, filed on Oct. 24, 2006, entitled "METHODS AND SYSTEMS FOR USING PULSED RADAR FOR COMMUNICATIONS TRANSPARENT TO RADAR FUNCTION" (the '372 application);
U.S. patent application Ser. No. 12/099,297, filed on Apr. 8, 2008, entitled "RADAR ALTIMETER WITH FORWARD LOOKING RADAR AND DATA TRANSFER CAPABILITIES" (the '297 application);
U.S. patent application Ser. No. 12/245,583, filed on Oct. 3, 2008, entitled "SYSTEM AND METHOD FOR OBSTACLE DETECTION AND WARNING" (the '583 application); and
U.S. patent application Ser. No. 12/245,334, filed on Oct. 3, 2008, entitled "RADAR SYSTEM FOR OBSTACLE AVOIDANCE" (the '334 application).

BACKGROUND

Proper navigation of an aerial vehicle is based on the ability to determine a position of the aerial vehicle. Some navigation systems display for a pilot an onboard map database keyed to the current position of the aerial vehicle. Typically, a Global Positioning System (GPS) receiver and an Inertial Measurement Unit (IMU) are used to determine the aerial vehicle's position. However, GPS requires radio frequency (RF) signal reception from satellites that can be interfered with and are not always available. When GPS is not available, digital map data, which is typically used for terrain obstacle avoidance, is unusable because there is no position reference available from GPS to use to provide an accurate position solution and orient a track of movements of the aerial vehicle onto the map.

Another significant problem for aerial vehicles is avoidance of terrain obstacles when flying near the ground. Cables represent a particularly insidious hazard, as they are difficult to see even during daylight flight in good visibility conditions. Collisions with cables and terrain obstacles result in dozens of injuries and deaths annually, with the problem being more severe in the armed services where it is common to fly in unsurveyed areas and for low level flights in remote areas. Even in surveyed areas, digital map data has insufficient resolution to symbolically represent or display cables. The survey is often days or weeks out of date and thereby does not contain current information on artificial obstacles that move into an area after the survey is completed. Currently, some aerial vehicles require the use of multi-mode radar (MMR) to operate in low to zero visibility flight environments. However, MMR has a large radar signature that increases the potential of detection by unfriendly forces.

SUMMARY

One embodiment comprises a method of generating an image of a volume ahead of an aerial vehicle. The method comprises determining a position of the aerial vehicle and generating a terrain image corresponding to ground features correlated to the position of the aerial vehicle. Obstacle data pertaining to a set of obstacles ahead of the aerial vehicle is determined with a forward looking sensor. An obstacle overlay image is generated and overlain onto the terrain image to generate a composite image.

Another embodiment is directed to an enhanced vision system for an aerial vehicle. The system comprises a radar altimeter operable to generate elevation data pertaining to an altitude of the aerial vehicle, a forward looking radar operable to generate obstacle data pertaining to a set of obstacles ahead of the aerial vehicle, and an inertial measurement unit (IMU) operable to determine attitude data pertaining to an attitude of the aerial vehicle. The system is operable to calculate position data by correlating the elevation data with a digital terrain elevation map and generate an obstacle overlay image. The system is further operable to render a terrain image using the position data and the attitude data and overlay the obstacle data overlay image onto the terrain image to generate a composite image. The system further comprises a display on which the composite image is displayed.

Another embodiment is directed to a program product for generating a composite image for display on at least one display device in an aerial vehicle. The program-product comprises a processor-readable medium on which program instructions are embodied. The program instructions are operable, when executed by at least one programmable processor included in the aerial vehicle, to cause the aerial vehicle to: determine a position of the aerial vehicle, generate a terrain image correlated to the position of the aerial vehicle; determine obstacle data pertaining to a set of obstacles ahead of the aerial vehicle with a forward looking radar associated with the aerial vehicle; and generate an obstacle overlay image for overlaying the obstacle overlay image onto the terrain image in order to generate the composite image for displaying at least a portion of the composite image on the at least one display device.

The details of various embodiments of the claimed invention are set forth in the accompanying drawings and the description below. Other features and advantages will become apparent from the description, the drawings, and the claims.

DRAWINGS

FIGS. 3A-3D are images depicting examples of enhanced vision system displays.

Like reference numbers and designations in the various drawings indicate like elements.

DETAILED DESCRIPTION

Figure 1:
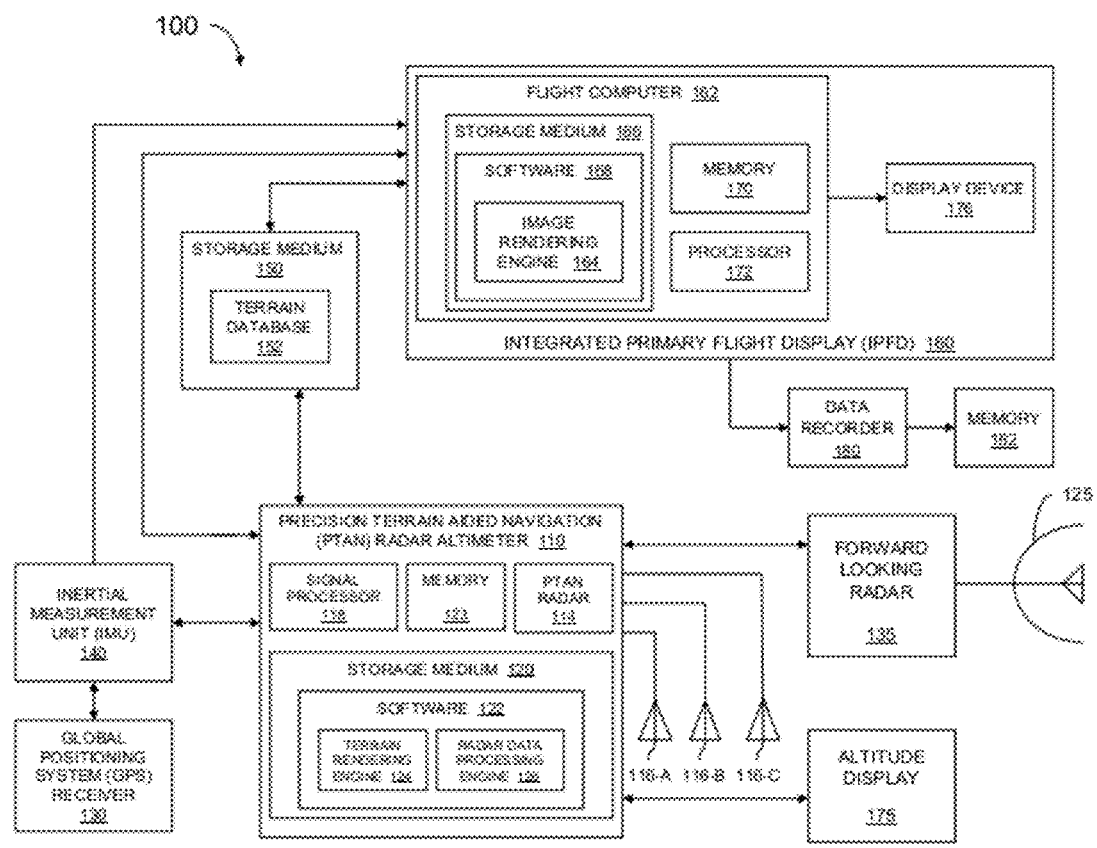
FIG. 1 is a block diagram of one embodiment of a combined enhanced navigation and enhanced vision system.

FIG. 1 is a block diagram of one embodiment of a combined enhanced navigation and enhanced vision system 100. The combined enhanced navigation and enhanced vision system 100 (also referred to herein as an enhanced vision system 100) is configured to operate onboard an aerial vehicle. An enhanced vision system 100 combines flight data and terrain information and displays it on a display device 176. The system 100 comprises a Precision Terrain Aided Navigation (PTAN) radar altimeter 110. The PTAN radar altimeter 110 measures ground terrain features using a PTAN radar 114. In the embodiment shown in FIG. 1, the PTAN radar 114 uses three antennas, 116-A, 116-B, and 116-C. Two of the antennas 116-A and 116-C are used for receiving 4.3 GHz radar signals. The other antenna 116-B is used for transmitting 4.3 GHz radar signals. Other numbers of antennas and other configurations of antennas and frequencies are used in other embodiments. The PTAN radar 114 is a first return tracking radar that is not affected by pitch or roll maneuvers when performed within the main beam of the antennas 116. Pitch and roll of the aerial vehicle is measured by an inertial measurement unit (IMU) 140 and this information is used by the PTAN radar altimeter 110 to correct the position location of the aerial vehicle.

In one implementation of the embodiment shown in FIG. 1, the PTAN radar 114 is implemented using a narrow beam Interferometric Synthetic Aperture Radar (IfSAR). IfSAR is a type of radar used in remote sensing that uses two or more synthetic aperture radar (SAR) images to generate maps of surface deformation or digital elevation using differences in the phase of the waves returning to the aircraft. IfSAR offers expanded operational capability in hostile environments by enabling Nap of the Earth flying with low probability of detection due to the IfSAR typically having a narrow beam.

The PTAN radar altimeter 110 comprises a signal processor 118 that is used to implement a radar data processing engine 126 and a terrain rendering engine 124. In the embodiment shown in FIG. 1, the radar data processing engine 126 and terrain rendering engine 124 are implemented in software 122 that is executed by the signal processor 118. The software 122 comprises program instructions that are stored on a suitable storage device or medium 120. Suitable storage devices or media 120 include, for example, forms of non-volatile memory, including by way of example, semiconductor memory devices (such as Erasable Programmable Read-Only Memory (EPROM), Electrically Erasable Programmable Read-Only Memory (EEPROM), and flash memory devices), magnetic disks (such as local hard disks and removable disks), and optical disks (such as Compact Disk-Read Only Memory (CD-ROM) disks). Moreover, the storage device or media 120 need not be local to the system 100. Typically, a portion of the software 122 executed by the signal processor 118 and one or more data structures used by the software 122 during execution are stored in a memory 123. The memory 123 comprises, in one implementation of such an embodiment, any suitable form of random access memory (RAM) now known or later developed, such as dynamic random access memory (DRAM). In other embodiments, other types of memory are used. The components of the PTAN radar altimeter 110 are communicatively coupled to one another as needed using suitable interfaces and interconnects.

Altitude and first return terrain location data from the PTAN radar 114 is provided to the signal processor 118. The PTAN radar 114 collects a variable sample of elevation data of the first return terrain points and compares this data to a high resolution digital elevation map to determine the aerial vehicle's location in three dimensions. This method can be used when primary positioning methods such as GPS are not available. The number of elevation points is variable based on the quality of the position location that is calculated by PTAN radar altimeter 110. Also coupled to the PTAN radar altimeter 110 is a forward looking radar 135. The signal processor 118 provides timing signals to, and controls the operation of, the forward looking radar 135. In one implementation of the embodiment shown in FIG. 1, the signal processor 118 is time shared between the PTAN radar 114 and the forward looking radar 135. For example, the processing performed by the signal processor 118 can be scheduled so that, during a first portion of the schedule, the signal processor 118 executes the software that implements the radar data processing engine 126 and the terrain processing engine 124 in order to calculate elevation and position data from the PTAN radar altimeter 110. In such an example, during another portion of the schedule, the signal processor 118 executes the software that implements the radar data processing engine 126 and terrain processing engine 124 in order to determine obstacle data from the forward looking radar 135.

The forward looking radar 135 is connected to an antenna 125. The forward looking radar 135 is operable to detect obstacles in the volume ahead of the aerial vehicle, such as cables or buildings in the aerial vehicle's flight path. In one implementation of the embodiment shown in FIG. 1, the forward looking radar 135 is configured to use 94 GHz RF signals. The frequency of the forward looking radar 135 is typically selected for stealth and a desired obstacle resolution. For example, a 94 GHz radar can detect a one centimeter diameter cable up to a distance of around one kilometer, depending on the characteristics of the cable. Similarly, a tower could be detected up to around ten kilometers away with a 94 GHz forward looking radar. In another embodiment of FIG. 1, the forward looking radar 135 is a millimeter wave (MMW) radar. In yet another embodiment, the forward looking radar 135 is a forward looking infrared (FLIR) sensor.

The forward looking radar 135 provides radar video data to the signal processor 118. The radar video data is raw radar data and can be transmitted to the signal processor 118 via a suitable Ethernet cable, such as a CAT-7 Ethernet cable. In such an implementation, only the Gigabit Ethernet physical-layer is used for such communications. The signal processor 118 generates an overlay image that includes any obstacles detected by the forward looking radar 135. This obstacle overlay image is to be added to a terrain image in order to display information about any obstacles that are ahead of the aerial vehicle. An image corresponding to a set of obstacles (which might include no obstacles, or one or more obstacles) ahead of the aerial vehicle (that is, the obstacle overlay image) is superimposed on an image corresponding to terrain data near which the aerial vehicle is located (that is, the terrain image) in order to generate a composite image. At least a portion of the composite image is displayed on one or more display devices so that respective portions of both the terrain image and obstacle image are both displayed together on the same one or more display devices. The radar data processing engine generates the obstacle overlay image. In other words, the radar processing engine 126 performs the image formation and processing, such as determining the position of the aerial vehicle, and generating the obstacle overlay image.

Additionally, the software 122 executed by the signal processor 118 provides an altitude display 175 with altitude data. The altitude display 175 can be any display device operable to display altitude data, for example a digital display, a LCD monitor, an LED display, or the like. In one embodiment, the altitude data is displayed on the display device 176 by superimposing it upon the composite image.

In the embodiment shown in FIG. 1, the enhanced vision system 100 includes a GPS receiver 130. The GPS receiver 130 determines the position of the aerial vehicle when GPS is available. In GPS denied conditions, the GPS receiver 130 is unable to provide the position of the aerial vehicle, so other means of determining the precise location of the aerial vehicle are utilized. In other embodiments, the enhanced vision system 100 does not include a GPS receiver 130.

The enhanced vision system 100 further comprises an inertial measurement unit (IMU) 140. The IMU 140 provides attitude data for the aerial vehicle (that is, the IMU 140 senses the orientation of the aerial vehicle with respect to the terrain). In one implementation of the embodiment shown in FIG. 1, the IMU 140 includes accelerometers for sensing a linear change in rate (that is, acceleration) along a given axis and gyroscopes for sensing change in angular rate (that is, used to determine rotational velocity or angular position). The IMU 140 determines the aerial vehicle's attitude and blends GPS position and PTAN position data. The IMU 140 provides position information at a uniform rate to the terrain rendering engine 124 implemented by the signal processor 118 so that the rendered images of the terrain data and the radar data move smoothly on the display device 176. The blending of the two position data sources provides a smooth transition between GPS available and GPS denied conditions. A smooth transition is accomplished by running both systems (that is, GPS and PTAN) simultaneously, calculating the position difference between them, and estimating the true position based on the dilution of precision calculated for each system at any given time. This establishes a position offset for each system. When either GPS or the PTAN system is no longer available, the offset between the estimated position and the position as calculated by the available system is added to the position of the available system in order to prevent a jump in apparent position of the aerial vehicle. The offset diminishes with time as long as only one system is available, as there is no secondary reference to indicate a different position as the correct position.

The terrain database 152 stores detailed maps of the earth's surface comprising terrain data (also referred to herein as map data), which includes elevation information. For example, the maps stored in the terrain database 152 can include a global mapping of the earth. The terrain data in the database 152 is referenced to an earth coordinate system. Flight data from the radar altimeter 110, the forward looking radar 135, and the IMU 140 are geo-referenced by transforming the data into the earth coordinate system used by the terrain database 152. Using a single coordinate system enables an image rendering engine 164 to easily match the detected obstacles from the obstacle overlay image data with terrain data from the terrain database 152.

In one implementation of the embodiment shown in FIG. 1, the terrain database 152 is stored in or on one or more storage devices or media 150. The signal processor 118 reads the terrain data from the one or more storage devices or media 150. Suitable storage devices or media 150 include, for example, forms of non-volatile memory, including by way of example, semiconductor memory devices (such as EPROM, EEPROM, and flash memory devices), magnetic disks (such as local hard disks and removable disks), and optical disks (such as CD-ROM disks). Moreover, the storage device or media 150 need not be local to the system 100.

The terrain database 152 provides terrain data to the signal processor 118. The terrain rendering engine 124 correlates the terrain features within the elevation track data from the PTAN radar 114. Correlating the elevation track data with the map data enables the system 100 to determine the precise position of the aerial vehicle in GPS denied conditions. In one implementation of such an embodiment, the terrain database 152 is a stored Digital Terrain Elevation Database (DTED) that is available from Honeywell International, Inc. (hereinafter referred to as Honeywell) or from the United States government. The DTED can be used to provide precision positions of the aerial vehicle equal to or better than GPS, allowing for high accuracy positioning within GPS denied environments. For example, the DTED level 4 database has a resolution of 3 meters. However, the accuracy of the database and resolution is dependent on the source.

The system 100 also includes an Integrated Primary Flight Display (IPDF) 160. The IPDF 160 is a synthetic vision system (SVS) which offers high resolution imaging of the surrounding terrain and obstacles near the aerial vehicle. Once the signal processor 118 has rendered the images for the navigation system, the images are transmitted to the IPDF 160. The IPDF 160 comprises a flight computer 162 and a display device 176. The flight computer 162 is used to implement the image rendering engine 164. The image rendering engine 164 is implemented in software 168 that is executed by a suitable processor 172. The software 168 comprises program instructions that are stored on a suitable storage device or medium 166. Suitable storage devices or media 166 include, for example, forms of non-volatile memory, including by way of example, semiconductor memory devices (such as EPROM, EEPROM, and flash memory devices), magnetic disks (such as local hard disks and removable disks), and optical disks (such as CD-ROM disks). Moreover, the storage device or media 166 need not be local to the system 100. Typically, a portion of the software 168 executed by the processor 172 and one or more data structures used by the software 168 during execution are stored in a memory 170. Memory 170 comprises, in one implementation of such an embodiment, any suitable form of random access memory (RAM) now known or later developed, such as dynamic random access memory (DRAM). In other embodiments, other types of memory are used. The components of flight computer 162 are communicatively coupled to one another as needed using suitable interfaces and interconnects. The image rendering engine 164 overlays the obstacle overlay image onto the terrain image. In one embodiment, the IPFD 160 and PTAN radar altimeter 110 share a common DTED 60 Gb database hard drive (not shown).

The display device 176 displays the composite image of the terrain image and the obstacle image overlay to a user (such as a pilot). The composite image is a superposition of the obstacle image data onto the terrain image. The display device 176 is operable to display additional information as well, such as object tracking information, altitude, pitch, pressure, and the like. The display device 176 can be any device or group of devices for presenting visual information, such as a liquid crystal display (LCD), plasma monitor, cathode ray tube (CRT), or the like. For example, the display device 176 is a single LCD that presents the composite image to a user. In another embodiment, the display device 176 is multiple LCDs that are used to present the composite image to a user (in other words, each individual LCD displays some portion of the object image overlay superimposed on the terrain image).

The signal processor 118 provides the radar image and obstacle image overlay to an image rendering engine 164. Other information provided to the image rendering engine 164 includes attitude data transmitted from the IMU 140 and map data from the terrain database 152. If GPS connection is available, position data from the GPS receiver 130 is provided to the image rendering engine 164. FIG. 1 shows the image rendering engine 164 as being implemented separately from the PTAN radar altimeter 110, although in other embodiments and implementations the image rendering engine 164 can be implemented within the PTAN radar altimeter 110.

The image rendering engine 164 overlays the obstacle overlay image onto the terrain map and generates perspectives for the composite image. Using the attitude data from the IMU 140, the image rendering engine 164 tilts the image to correct for movements of the aerial vehicle. The composite image is provided to the display device 176, which in one embodiment is a synthetic image display. The display device 176 displays the composite image to a pilot, and corrections for tilt of the aerial vehicle are made real-time. In one implementation of the embodiment shown in FIG. 1, the display 176 is implemented using the Common Avionics Architecture System (CAAS) flight display system that is commercially available from Honeywell.

The obstacle data and the altitude data from the PTAN radar altimeter 110 is sent to a data recorder 180. The data recorder 180 records the flight information and stores it in a computer readable memory 182. The flight information can be provided to the data recorder 180 from the PTAN radar altimeter 110 over optical cable, or by any other method of transmission.

Figure 2:
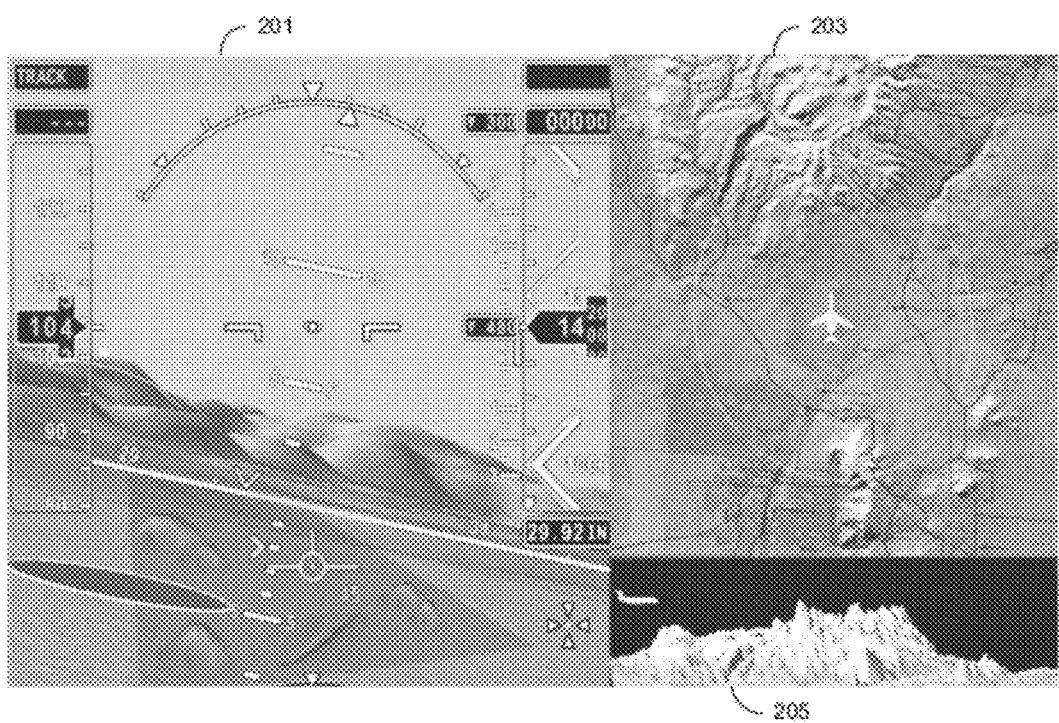
FIG. 2 is an image of one embodiment of the perspectives displayable in the enhanced vision system of FIG. 1.

FIG. 2 is an image of one embodiment of the perspectives displayable in a synthetic vision system (SVS). SVS employs computer generated terrain imagery from onboard DTED databases matched with precision navigation information to create a presentation of the outside world around the aerial vehicle. The IPFD provides a clear electronic representation of the outside world around the aerial vehicle, and can display different perspectives. For example, the image shown at 201 is a three-dimensional (3D) perspective (egocentric) view, with flight data superimposed on the composite image (such as altitude, pitch, tilt, etc.). The image 203 depicts a plan view (lookdown, exocentric), and the image 205 displays a vertical profile. The SVS can include additional features to aid flight, such as displaying other sensor information (attitude, elevation, etc.).

This synthetic vision system integrates together primary flight information from all available sources on the aerial vehicle (such as the radar and IMU sensors). The IPFD synthetic vision system can also functionally host the Military Digital Moving Map (DMM) by Honeywell, which is a display system that shows the geographic area an aerial vehicle is in, updated as the aerial vehicle moves. These advanced features enable a flight crew to re-route their flight plan and perform mission planning while in the air, giving additional flexibility to the crew at a much reduced workload.

The enhanced vision system (EVS) described above in connection with FIG. 1 provides real time imaging by merging sensor data with the IPFD 160. SVS and EVS data merged on the IPFD 160 shows "what is actually out there" to provide greater situational and obstacle awareness. The raw sensor return is processed by the image rendering engine 164 to clean up the image and geospatially scale and align the image to the IPFD 160, which offers a greater field of view and cleaner imaging than sensor imaging alone.

Motivations to fuse sensor data with EVS instead of just using the sensor data alone include reduction in limitations such as a limited field of view (similar to looking through a soda straw), limited range, noise (scintillation on a display device causes eye fatigue), and interpretation difficulties. Also, since no sensor sees through all particulates at all temperatures in all conditions, multiple sensors can be combined to cover the necessary conditions. The pilot is provided with a real time visualization of the terrain and obstacles in and around the flight path.

Figure 3A:
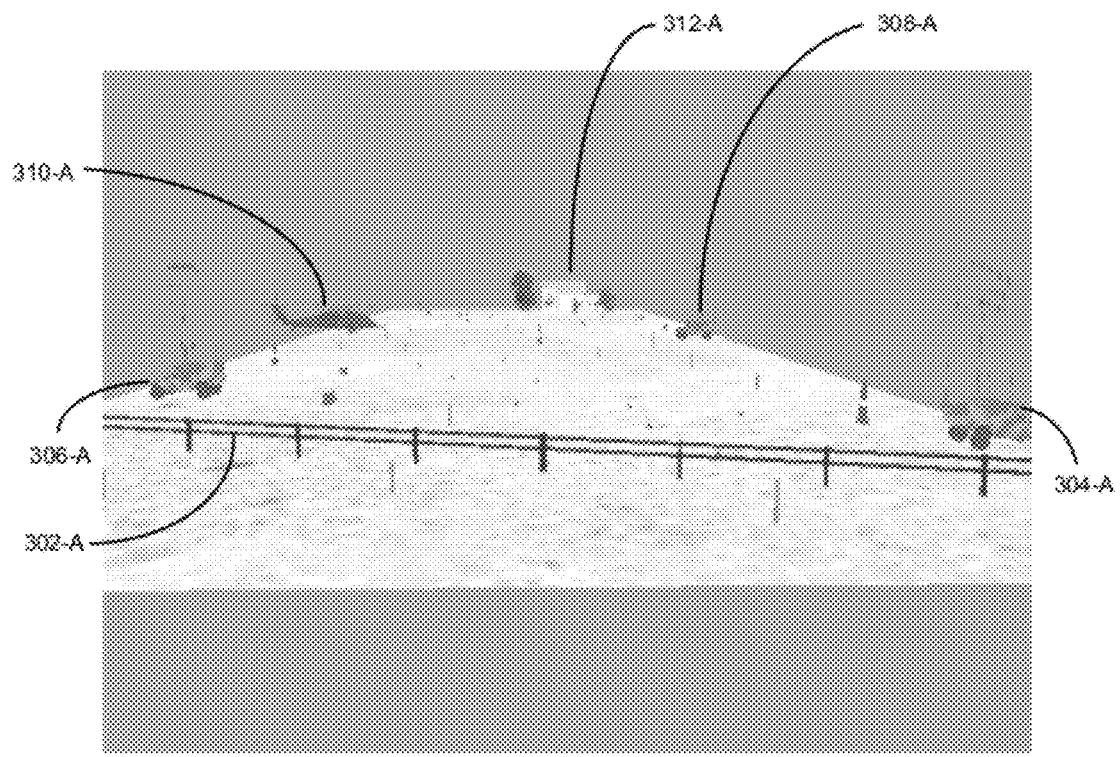
Figure 3B:
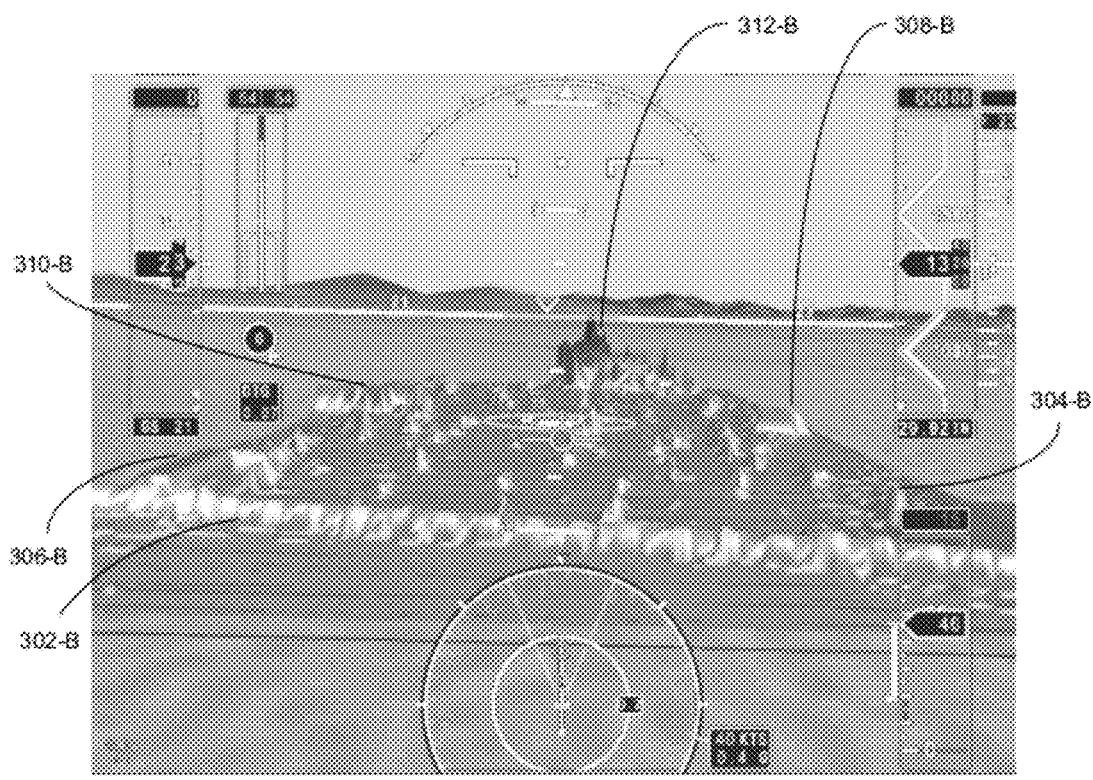

FIGS. 3A-3D are images depicting examples of enhanced vision system (EVS) displays produced by the IPFD of FIG. 1. FIG. 3A is a pictorial representation of the obstacles detected by the forward looking radar 135. Among the obstacles detected are a fence 302-A, trucks 304-A, 306-A and 308-A, a helicopter 310-A and a house 312-A. FIG. 3B shows a radar image displayed by an EVS 100 corresponding to the obstacles detected by the forward looking radar 135 in FIG. 3A. In other words, FIG. 3B illustrates the same terrain image from FIG. 3A as well as the obstacle overlay image. Thus, the fence 302-A detected by the forward looking radar 135 in FIG. 3A is displayed as 302-B in FIG. 3B. Likewise the trucks 304-A, 306-A and 308-A appear as obstacles 304-B, 306-B and 308-B, respectively. The helicopter 310-A shows up as obstacle 310-B and the house 312-A is displayed as obstacle 312-B.

FIG. 3C shows an EVS 100 with a 94 GHz MMW radar (not shown) overlay. This image shows a runway detected by the forward looking MMW radar. Additionally, other instrument and sensor data has been overlaid onto the composite image. FIG. 3D illustrates an overlay from an optical sensor, in particular a forward looking infrared (FLIR) (not shown). The FLIR detects a marsh ahead of the aerial vehicle.

Figure 4:
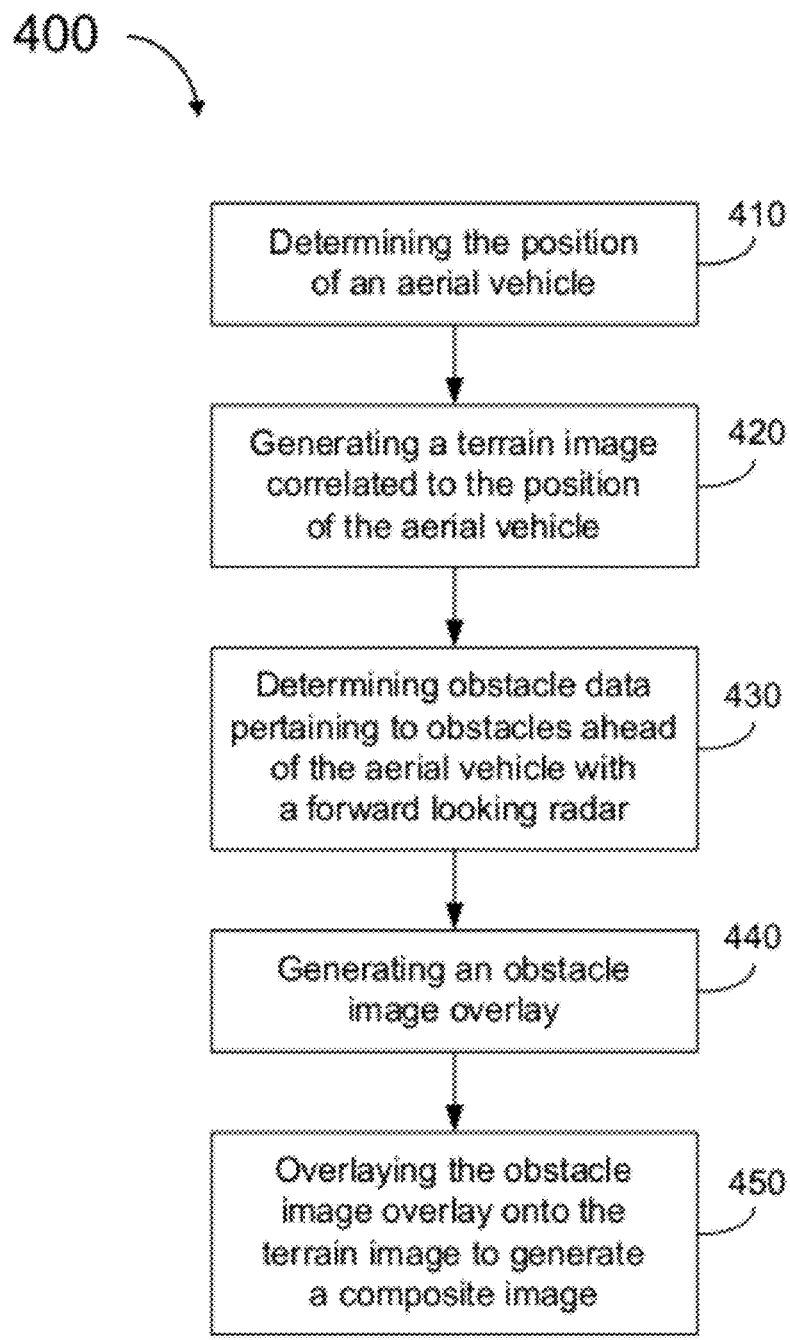
FIG. 4 is a flowchart of one embodiment of a method of generating an enhanced vision obstacle image of the volume ahead of an aerial vehicle.

FIG. 4 is a flowchart of one embodiment of a method 400 of generating an obstacle image of the volume ahead of an aerial vehicle. The embodiment of method 400 shown in FIG. 4 is described here as being implemented using the enhanced vision system 100 of FIG. 1, although other embodiments are implemented in other ways. The method 400 comprises determining the position of an aerial vehicle (block 410). In this embodiment, the aerial vehicle has a GPS receiver 130. If GPS is available, the position of the aerial vehicle is obtained from the GPS receiver 130. When GPS is not available (or in other embodiments where the aerial vehicle does not include a GPS receiver 130), the position of the aerial vehicle is determined using a radar altimeter 110. Embodiments of methods for determining the position of the aerial vehicle are discussed below with respect to FIG. 5.

Once the position of the aerial vehicle is determined, a terrain image correlated to the position of the aerial vehicle is generated (block 420). The terrain image is generated by a terrain rendering engine 118. The terrain rendering engine 118 takes the position data, either from GPS 130 or the PTAN radar altimeter 110, along with attitude information and renders an image of the terrain. The terrain image can be provided by a digital map data stored in a memory onboard the aerial vehicle. One such digital map database is the Digital Terrain Elevation Database (DTED) that is commercially available from Honeywell. The position of the aerial vehicle determines the corresponding coordinates of the digital map. The IMU 140 provides attitude data pertaining to the attitude of the aerial vehicle, which can be used to orient the map. The map can be oriented such that the terrain ahead of the aerial vehicle would be shown in a display device 176.

In the embodiment shown in FIG. 4, the method 400 further comprises determining obstacle data pertaining to obstacles ahead of the aerial vehicle (block 430). Obstacles ahead of the aerial vehicle are detected by a forward looking radar 135 or other sensor (such as a FLIR). In one implementation of this embodiment, the forward looking radar 135 operates at approximately 94 GHz. Additionally, the method 400 can be implemented using many types of sensors including advanced Millimeter Wave Radar, Laser Detection and Ranging (LADAR), and optical cooled and uncooled infrared systems.

Once the obstacle data is determined, an obstacle overlay image is generated (block 440). The obstacle overlay image is information to be added to a terrain display indicating obstacles present ahead of the aerial vehicle. Such obstacles include cables, poles for running cables, buildings, and the like. The radar data processing engine 118 generates the obstacle overlay image. The obstacle overlay image is overlain onto the terrain image to generate a composite image (block 450). The image rendering engine 164 takes the range and bearing information from the forward looking radar generated by the radar data processing engine 118 and overlays this radar return object data onto the terrain image to generate a composite image showing real-time updated terrain obstacles such as cables and other small objects that are not present in the terrain elevation map data. In other words, this composite image shows the terrain ahead of the aerial vehicle with images of the obstacles detected by the forward looking radar 135 superimposed on the terrain image. The composite image is presented to a pilot on a display device and is updated in real-time.

Figure 5:
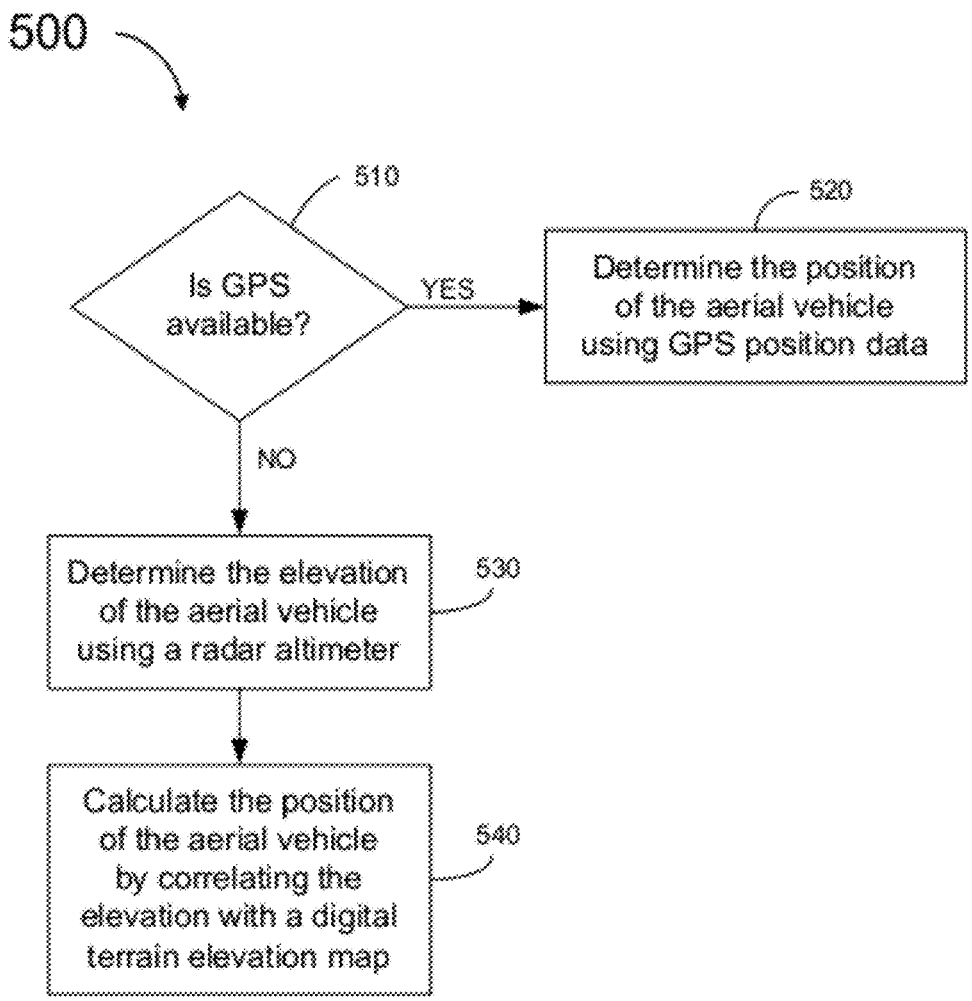
FIG. 5 is a flowchart of one embodiment of a method of determining the position of an aerial vehicle.

FIG. 5 is a flowchart of one embodiment of a method 500 of determining the position of an aerial vehicle. The embodiment of method 500 shown in FIG. 5 is described here as being implemented using the EVS 100 of FIGS. 1 and 2, though other embodiments are implemented in other ways. In this embodiment, the aerial vehicle is equipped with a GPS receiver 130. Method 500 comprises querying whether GPS is available (block 510). If GPS is available, the position of the aerial vehicle is determined from the GPS position data (block 520).

If GPS is unavailable (that is, in a GPS denied scenario or if the aerial vehicle does not have a GPS receiver), the altitude of the aerial vehicle is determined (block 530). The altitude of the aerial vehicle can be determined by using a radar altimeter or by any other method known to those of skill in the art. One contemplated radar altimeter is the Precision Terrain Aided Navigation (PTAN) radar altimeter that is commercially available from Honeywell. Once the altitude is known, the position of the aerial vehicle is calculated by correlating the altitude with a digital terrain map (block 540). A single altitude value is insufficient to indicate where the aerial vehicle is located, but a track of altitudes gathered over the course of flight can be used to match to the digital elevation map 152. The PTAN radar altimeter 110 is used to determine position with GPS-like accuracy without the use of GPS by comparing ground track radar altitude measurements to the stored digital elevation map data 152.

Data from the IMU 140 can also be used in determining the position of the aerial vehicle. The correlation of the altitude data with the digital terrain map 152 can be narrowed using previous known positions of the aerial vehicle, its trajectory, and inertial data from the IMU 140. Also, the IMU data can be used to orient the map to the direction of travel of the aerial vehicle, in GPS allowed or GPS denied conditions. Attitude data from the IMU 140 can be correlated with the altitude of the aerial vehicle. The IMU data is used to smooth the transition between GPS allowed and GPS denied conditions.

In sum, embodiments provide precision navigation solutions for aerial vehicle without the use of Global Positioning Satellite (GPS) inputs which maximize each of the navigation's separate systems' features to provide a combined accuracy beyond the aerial vehicle's current navigational system's capabilities. The EVS with PTAN and an Integrated Primary Flight Display provides a highly accurate autonomous navigation solution in GPS denied conditions. The EVS 100 of FIG. 1 provides the best of all onboard sensors by combining independent sensor instruments such as a FLIR or a 94 GHz millimeter wave radar system into a large high resolution image with IPFD 160. The enhanced vision system 100 provides a forward looking radar 135 capable of detecting cables and ground objects in low visibility conditions along with a method of determining position alternative to GPS. If the aerial vehicle's position is determined from the GPS receiver 130, the accuracy of the position can be increased by the PTAN system 110. Data from the forward-looking radar sensor 135 on the aerial vehicle can be overlaid onto the terrain image and displayed to the pilots. The combination of these systems increases the accuracy of the current onboard inertial navigation system and the aerial vehicle's current flight display system, as well as increased operational capability in limited visibility scenarios.

Although the enhanced vision system of FIG. 1 is not entirely passive, it does offer a low probability of detection coupled with an entirely self contained on-board autonomous system to deliver high precision navigation in hostile and GPS denied conditions. The EVS 100 with PTAN 110 is an onboard system that can provide terrain situational awareness and the aerial vehicle's positional data while reducing emissions from the aerial vehicle and reliance on GPS and IMU data.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method of generating an image of a volume ahead of an aerial vehicle, the method comprising:
   determining a position of the aerial vehicle using global positioning system (GPS) position data when GPS position data is available, and when GPS position data is not available, determining the position of the aerial vehicle by:
   determining an altitude of the aerial vehicle using a radar altimeter; and
   calculating the position of the aerial vehicle by correlating the altitude with a digital terrain elevation map and correlating attitude data from an inertial measurement unit (IMU) pertaining to an attitude of the aerial vehicle with the elevation of the aerial vehicle;
   generating a terrain image corresponding to ground features correlated to the position of the aerial vehicle;
   determining obstacle data pertaining to a set of obstacles ahead of the aerial vehicle with a forward looking sensor;
   generating an obstacle overlay image; and
   overlaying the obstacle overlay image onto the terrain image to generate a composite image,
   wherein the IMU is operable to smooth the transition between when GPS position data is available and when GPS position data is not available by:
   determining a position difference between the GPS position data and the position data calculated by correlating the altitude with a digital terrain elevation map; and
   establishing an offset for the GPS position data and an offset for the position data calculated by correlating the altitude with a digital terrain elevation map based upon the position difference.

2. The method of claim 1, further comprising wherein the method causes the aerial vehicle to display at least a portion of the composite image on at least one display device.

3. The method of claim 1, further comprising time sharing a signal processor between determining the position of the aerial vehicle and generating the obstacle data image overlay.

4. The method of claim 1, wherein generating the terrain image correlated to the position of the aerial vehicle further comprises:
generating the terrain image using a terrain rendering engine.

5. The method of claim 1, wherein generating the obstacle overlay image further comprises:
generating the obstacle overlay image using a radar data processing engine.

6. The method of claim 1, wherein the forward looking sensor comprises at least one a 94 GHz forward looking radar, a forward looking infrared (FLIR) sensor, a Laser Detection and Ranging (LADAR) sensor, and a Millimeter Wave Radar (MMW).

7. An enhanced vision system for an aerial vehicle, the system comprising:
a radar altimeter operable to generate elevation data pertaining to an altitude of the aerial vehicle;
a forward looking radar operable to generate obstacle data pertaining to a set of obstacles ahead of the aerial vehicle; and
an inertial measurement unit (IMU) operable to determine attitude data pertaining to an attitude of the aerial vehicle;
a global positioning system (GPS) receiver operable to provide GPS position data for use by the system in rendering the terrain image;
wherein the system is operable to:
calculate position data by correlating the elevation data with a digital terrain elevation map and blend the GPS position data and the position data from the radar altimeter to smooth a transition between GPS available and GPS denied conditions by:
determining a position difference between the GPS position data and the position data calculated by correlating the altitude with a digital terrain elevation map; and
establishing an offset for the GPS position data and an offset for the position data calculated by correlating the altitude with a digital terrain elevation map based upon the position difference;
generate an obstacle overlay image;
render a terrain image using the position data and the attitude data;
overlay the obstacle data overlay image onto the terrain image to generate a composite image; and
wherein the system further comprises a display on which the composite image is displayed.

8. The enhanced vision system of claim 7, wherein the forward looking radar operates at approximately 94 GHz.

9. The enhanced vision system of claim 7, wherein the radar altimeter is communicatively coupled to the forward looking radar.

10. The enhanced vision system of claim 7, wherein the radar altimeter comprises a signal processor that is time shared between calculating the position data and generating the obstacle data image overlay.

11. The enhanced vision system of claim 7, wherein the IMU provides the position data at a uniform rate so that the composite image moves smoothly on the display device to correlate with motion of the aerial vehicle.

12. The enhanced vision system of claim 7, wherein the IMU is further operable to:
provide constantly available position data at a uniform rate so that the composite image moves smoothly on the display device.

13. A program product for generating a composite image for display on at least one display device in an aerial vehicle, the program-product comprising a processor-readable medium on which program instructions are embodied, wherein the program instructions are operable, when executed by at least one programmable processor included in the aerial vehicle, to cause the aerial vehicle to:
determining a position of the aerial vehicle using global positioning system (GPS) position data when GPS position data is available, and when GPS position data is not available, determining the position of the aerial vehicle by:
determining an altitude of the aerial vehicle using radar altimeter data; and
calculating the position of the aerial vehicle by correlating the altitude with digital terrain elevation map data and correlating attitude data from an inertial measurement unit (IMU) pertaining to an attitude of the aerial vehicle with the elevation of the aerial vehicle;
blend the GPS position data and the data from the radar altimeter to smooth a transition between GPS available and GPS denied conditions by:
determining a position difference between the GPS position data and the position data calculated by correlating the altitude with a digital terrain elevation map; and
establishing an offset for the GPS position data and an offset for the position data calculated by correlating the altitude with a digital terrain elevation map based upon the position difference;
generate a terrain image correlated to the position of the aerial vehicle;
determine obstacle data pertaining to a set of obstacles ahead of the aerial vehicle with a forward looking radar associated with the aerial vehicle; and
generate an obstacle overlay image for overlaying the obstacle overlay image onto the terrain image in order to generate the composite image for displaying at least a portion of the composite image on the at least one display device.

14. The program product of claim 13, wherein the at least one programmable processor included in the aerial vehicle comprises a signal processor included in a radar altimeter, and wherein the program instructions are configured so that the signal processor is time shared between calculating the position data and generating the obstacle data image overlay.

15. The method of claim 1, further comprising:
adding, in response to the GPS position data being not available, the offset for the GPS position data to the position data calculated by correlating the altitude with a digital terrain elevation map.

16. The method of claim 15, further comprising diminishing the offset for the GPS position data over time while the GPS position data is not available.

17. The method of claim 1, further comprising:
adding, in response to the position data calculated by correlating the altitude with a digital terrain elevation map being unavailable, the offset for the position data calculated by correlating the altitude with a digital terrain elevation map to the GPS position data.

18. The method of claim 17, further comprising diminishing the offset for the position data calculated by correlating the altitude with a digital terrain elevation map over time while the position data calculated by correlating the altitude with a digital terrain elevation map is not available.

19. The enhanced vision system of claim 7, wherein the system is further operable to:
   add, in response to the GPS position data being not available, the offset for the GPS position data to the position data calculated by correlating the altitude with a digital terrain elevation map.

20. The enhanced vision system of claim 19, wherein the system is further operable to diminish the offset for the GPS position data over time while the GPS position data is not available.

21. The enhanced vision system of claim 7, wherein the system is further operable to:
   add, in response to the position data calculated by correlating the altitude with a digital terrain elevation map being unavailable, the offset for the position data calculated by correlating the altitude with a digital terrain elevation map to the GPS position data.

22. The enhanced vision system of claim 21, wherein the system is further operable to diminish the offset for the position data calculated by correlating the altitude with a digital terrain elevation map over time while the position data calculated by correlating the altitude with a digital terrain elevation map is not available.

23. The program product of claim 13, wherein the aerial vehicle is further configured to:
   add, in response to the GPS position data being not available, the offset for the GPS position data to the position data calculated by correlating the altitude with a digital terrain elevation map.

24. The program product of claim 23, wherein the aerial vehicle is further configured to diminish the offset for the GPS position data over time while the GPS position data is not available.

25. The program product of claim 13, wherein the aerial vehicle is further configured to:
   add, in response to the position data calculated by correlating the altitude with a digital terrain elevation map being unavailable, the offset for the position data calculated by correlating the altitude with a digital terrain elevation map to the GPS position data.

26. The program product of claim 25, wherein the aerial vehicle is further configured to diminish the offset for the position data calculated by correlating the altitude with a digital terrain elevation map over time while the position data calculated by correlating the altitude with a digital terrain elevation map is not available.

* * * * *